United States Patent
Wang et al.

(10) Patent No.: US 10,266,406 B1
(45) Date of Patent: Apr. 23, 2019

(54) PRODUCING HIGH-PURITY CHLORINE DIOXIDE GAS

(71) Applicant: GuangXi University, Nanning (CN)

(72) Inventors: Shuangfei Wang, Nanning (CN); Chengrong Qin, Nanning (CN); Shuangxi Nie, Nanning (CN); Xueping Song, Nanning (CN); Chen Liang, Nanning (CN); Xinliang Liu, Nanning (CN); Zhiwei Wang, Nanning (CN); HongXiang Zhu, Nanning (CN)

( * ) Notice: Subject to any disclaimer, the term of this patent is extended or adjusted under 35 U.S.C. 154(b) by 0 days.

(21) Appl. No.: 16/011,684

(22) Filed: Jun. 19, 2018

(30) Foreign Application Priority Data

May 18, 2018 (CN) .............................. 201810482903

(51) Int. Cl.
*B01J 7/02* (2006.01)
*B01J 19/24* (2006.01)
*C01B 11/02* (2006.01)
*B01D 9/00* (2006.01)

(52) U.S. Cl.
CPC .......... *C01B 11/026* (2013.01); *B01D 9/0022* (2013.01); *B01J 7/02* (2013.01); *B01J 19/24* (2013.01); *B01D 2256/26* (2013.01); *B01D 2257/2025* (2013.01); *B01J 2219/182* (2013.01)

(58) Field of Classification Search
CPC .................................................... C01B 11/026
See application file for complete search history.

(56) References Cited

U.S. PATENT DOCUMENTS

| 3,446,584 A * | 5/1969 | Fuller ................... C01B 11/025 423/480 |
| 4,104,365 A * | 8/1978 | Howard ................ C01B 11/023 23/300 |
| 4,483,740 A * | 11/1984 | Parkinson ............. C01B 11/025 159/47.3 |
| 2003/0138371 A1* | 7/2003 | McWhorter ............... B01J 7/02 423/478 |
| 2010/0189632 A1* | 7/2010 | Sokol .................... C01B 11/023 423/480 |

FOREIGN PATENT DOCUMENTS

| CN | 108439341 A | * | 8/2018 | |
| EP | 0612686 A2 | * | 8/1994 | ........... C01B 11/026 |
| WO | WO-2006033609 A1 | * | 3/2006 | ........... C01B 11/026 |

* cited by examiner

*Primary Examiner* — Jennifer A Leung
(74) *Attorney, Agent, or Firm* — LeonardPatel PC

(57) ABSTRACT

A high-purity chlorine dioxide gas may use hydrogen peroxide as a reducing agent and may use horizontal generator, evaporation crystallizer, dryer and other devices to produce chlorine dioxide gas (product) and sodium sulfate (by-product). Compared to the conventional chlorine dioxide preparation system, the chlorine dioxide reaction and the sodium sulfate crystallization are performed in two processes. These processes are relatively separate and independent, and continuously produce chlorine dioxide gas with high purity and low moisture content while the by-product salt cake is evaporated, crystallized, filtered and dried, thereby producing sodium sulfate, without generating solid and liquid waste.

5 Claims, 1 Drawing Sheet

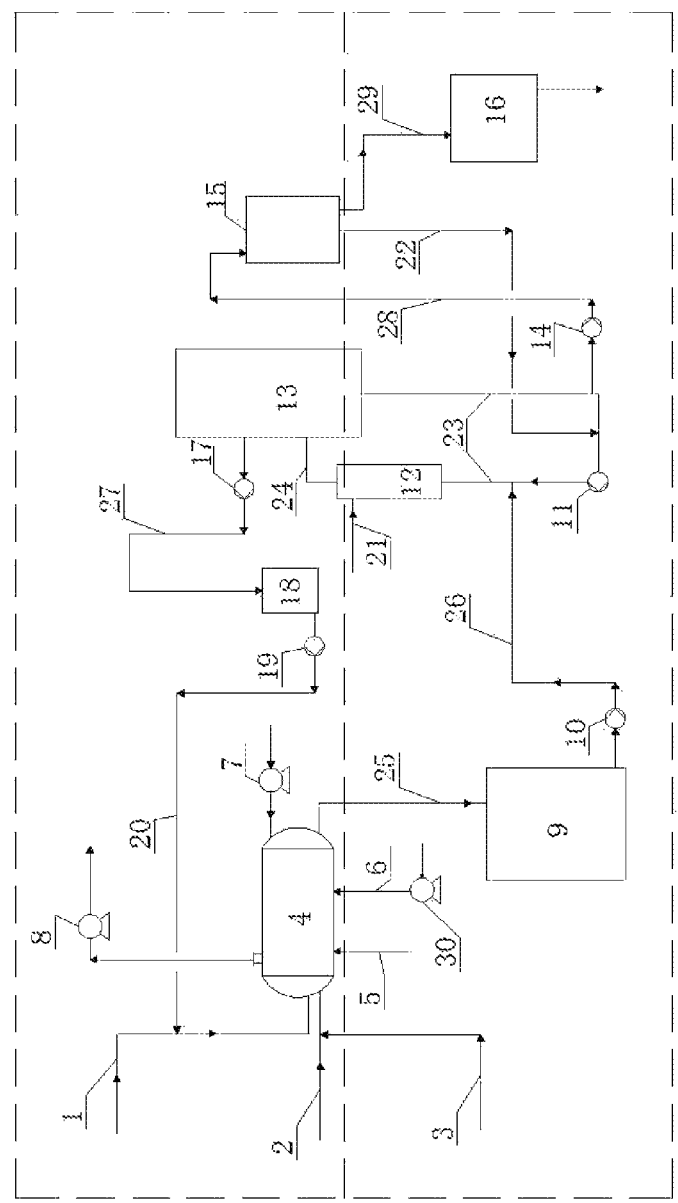

PRODUCING HIGH-PURITY CHLORINE DIOXIDE GAS

CROSS-REFERENCE TO RELATED APPLICATION

This application claims the benefit of, and priority to, Chinese Patent Application No. 201810482903.6, filed on May 18, 2018. The subject matter thereof is hereby incorporated herein by reference in its entirety.

FIELD

The present invention generally relates to chlorine dioxide preparation, and more particularly, to a process, system, and apparatus for producing high-purity chlorine dioxide gas.

BACKGROUND

Chlorine dioxide (ClO2) is a yellow orange gas at normal temperature and pressure and has an irritating and spicy taste similar to a mixture of chlorine and ozone. The boiling point is 11° C., the freezing point is −59° C., and the gaseous density is 3.09 g/m$^3$ at 11° C. Gaseous $ClO_2$ is unstable. Exposure of gaseous $ClO_2$ to light or organic matter at high concentration will cause it to decompose violently and produce oxygen and chlorine. Normally it must be produced at the mill near its point of application. It is more stable when diluted to lower than 12% volume content with air or steam at atmospheric temperature or in the state of a low-temperature water solution. $ClO_2$ is a strong oxidizer and can be used as a bleaching agent for pulp and textiles, and as water treatment agent, new air purifying freshener, and a disinfection, sterilizing, deodorizing agent for food, epidemic prevention, hygiene, etc.

At present, the main methods of producing chlorine dioxide include the methanol method and the integrated method. The methanol method uses methanol, sulfuric acid, and sodium chlorate as raw materials, and a vertical generator is used to produce chlorine dioxide. The chlorine dioxide product has a large moisture content of up to 80% (w/w) or more, and contains a small amount of chlorine. The integrated method uses hydrochloric acid and sodium chlorate as raw materials and either a vertical generator or horizontal generator can be used, but the chlorine dioxide gas contains a lot of chlorine, and the molar ratio of chlorine dioxide to chlorine is 2:1. For the use areas with high purity requirements (such as sodium chlorite preparation, food and medicine area, etc.), the purity of chlorine dioxide produced by the above two preparation methods cannot meet the use requirements.

In addition, chlorine dioxide product produced by common industrial chlorine dioxide preparation device are pumped to the final use areas in the form of low-temperature chlorine dioxide solution, not supplied in the form of gas.

Accordingly, an improved process and apparatus for producing high-purity chlorine dioxide gas may be beneficial.

SUMMARY

Certain embodiments of the present invention may provide solutions to the problems and needs in the art that have not yet been fully identified, appreciated, or solved by conventional chlorine dioxide preparation technologies. For example, some embodiments pertain to a process and apparatus for producing high-purity chlorine dioxide gas.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a schematic diagram illustrating a high-purity chlorine dioxide gas production device, according to an embodiment of the present invention.

DETAILED DESCRIPTION OF THE EMBODIMENTS

FIG. 1 is a schematic diagram illustrating a high-purity chlorine dioxide gas production device (100), according to an embodiment of the present invention. The device (100) includes a horizontal generator (4), a blower (7), an induced draft fan (8), a mother liquid discharge tank (9), a crystallizer feed pump (10), a circulating pump (11), a heater (12), an evaporation crystallizer (13), a filtration unit feed pump (14), a filtration unit (15), a dryer (16), a mother liquid extraction pump (17), a mother liquid tank (18), a mother liquid return pump (19), and an air compressor (30). Although the term "mother liquid" is used in this application, the term "mother liquid" may also be known as "mother liquor". The sulfuric acid pipe (1) is connected with the horizontal generator (4). The hydrogen peroxide pipe (2) joins the sodium chlorate pipe (3) and the pipes are connected to the horizontal generator (4). The heat source pipe (5) is connected to the inlet of the horizontal generator (4). The compressed air pipe (6) is connected to the air compressor (30) and the horizontal generator (4). The horizontal generator (4) is connected to the mother liquid discharge tank (9) through a reaction liquid (mother liquid) discharge pipe (25). The mother liquid discharge tank (9) is connected with the mother liquid lower circulating pipe (23) through the inlet/outlet pipe (26) of the crystallizer feed pump. The mother liquid lower circulating pipe (23) and the mother liquid upper circulating pipe (24) are connected with the evaporation crystallizer (13), the heater (12) and the circulating pump (11). The mother liquid tank (18) is connected to the evaporation crystallizer (13) and the horizontal generator (4) respectively through the inlet/outlet pipe of the mother liquid extraction pump (27) and the inlet/outlet pipe of the mother liquid return pump (20). The heat source pipe (21) is connected to the inlet pipe of the heater (12). The filtration unit (15) is connected to the mother liquid lower circulating pipe (23) through the inlet/outlet pipe of the feed pump (28) and the filtrate pipe (22) to form a circulation loop. The filtration unit (15) is connected to the dryer (16) via the salt cake discharge pipe (29).

In some embodiments, to make the chlorine dioxide preparation system run smoothly and continuously, a mother liquid discharge tank (9) with buffer effect and a mother liquid tank (18) are equipped between the horizontal generator (4) and the evaporation crystallizer (13). The chlorine dioxide reaction device and the evaporation crystallization device are relatively separated and independent.

In some embodiments, to make the reaction liquid of the horizontal generator (4) enter to the evaporation crystallizer (13), the reaction liquid discharge pipe (25) and inlet/out pipe (26) of the crystallizer feed pump are equipped before and after the mother liquid discharge tank (9). to respectively connect with the horizontal generator (4) and mother liquid lower circulating pipe (23). To make the supernatant of the evaporation crystallizer (13) return to the horizontal generator (4), the mother liquid return pump (19), extraction pump (17) and corresponding pipeline are equipped before and after the mother liquid tank (18) and are respectively connected to the evaporation crystallizer (13) and the horizontal generator (4).

In certain embodiments, to facilitate the circulation, evaporation and concentration of the mother liquid, the evaporation crystallizer (13), heater (12) and circulation pump (11) are connected in series by the mother liquid lower circulating pipe (23) and upper circulating pipe (24) to form a circulation loop.

In an embodiment, to make full use of the salt cake and filtrate and avoid waste generated, the filtration unit (15) is provided with filtrate pipe (22) and salt cake discharge pipe (29) to respectively connect with the mother liquid lower circulating pipe (23) and dryer (16) to form a filtrate liquid return channel and salt cake treatment channel.

The invention provides a method for producing high-purity chlorine dioxide gas by using hydrogen peroxide, sulfuric acid and sodium chlorate as raw materials to produce chlorine dioxide and drying the salt cake to produce salt cake powder. The specific steps are as follows:

Step 1, sulfuric acid enters the horizontal generator (4) through pipe (1); the reducing agent—hydrogen peroxide is transferred through pipe (2) and enters the horizontal generator (4) after being mixed with the sodium chlorate in the pipe (3), chlorine dioxide gas is generated after the redox reaction.

Step 2, while the raw material enters the horizontal generator (4) from one end, the reaction liquid after reacted is discharged from the other end into the mother liquid discharge tank (9) for storage, and then sent to the mother liquid into the lower circulating pipe (23) by the crystallizer feed pump (10). circulation, heating, evaporation and concentration between the evaporation crystallizer (13) and the heater (12) under the pumping action of the circulating pump (11); the salt cake in the mother liquid is concentrated and crystallized and is deposited at the bottom of the evaporation crystallizer (13) and the lower circulating pipe (23) and sent to the filtration unit (15) through the feed pump (14) for filtration, washing and concentration. Concentrated solid salt cake enters the dryer (16) to produce sodium sulfate powder with a dryness up to 99.5% (which can be sold as a byproduct); the filtrate liquid is returned to the mother liquid circulating pipe (23) via the filtrate liquid pipe (22).

Step 3, the clarified mother liquid in the upper of the evaporation crystallizer (13) is sent to the mother liquid tank (18) by the mother liquid extraction pump (17) for buffering, and then sent to the horizontal generator (4) by the mother liquid return pump (19).

In some embodiments, the heat source adds to the horizontal generator (4) through pipe (5) to heat the reaction solution indirectly, under the small negative pressure condition, the temperature of the reaction liquid is step increased from 20-30° C. to 80-85° C.; the air is compressed by the air compressor (30) and then enters the horizontal generator (4) and stirs the reaction liquid to make the reaction uniform while releasing and diluting the chlorine dioxide gas; in addition, the blower (7) blows the air into the horizontal generator (4) for further diluting the chlorine dioxide gas concentration to 4-9% (V/V); the diluted chlorine dioxide gas is sent out to the end use areas by the induced draft fan (8). The above-mentioned process can avoid the violent reaction during the preparation process and high concentration of chlorine dioxide, thus to avoid $ClO_2$ decomposition, as well as avoid the salt cake crystallization in the horizontal generator (4) due to the high reaction temperature and excess water evaporation. The achieved chlorine dioxide gas has a moisture content of less than 8% (w/w) and is substantially free of chlorine.

In some embodiments, to increase the evaporation efficiency and save heat source, the temperature in the evaporation crystallizer is controlled at 70-73° C. And the vacuum is controlled at −79 to −81 KPa (g).

The invention provides a method and devices for producing high-purity chlorine dioxide gas, which have the following advantages and effects:

The invention describes a device for producing high-purity chlorine dioxide gas, a mother liquid discharge tank (9) and a mother liquid tank (18) are equipped between the horizontal generator (4) and the evaporation crystallizer (13), make the chlorine dioxide reaction device and the evaporation crystallization device relatively separated and independent. Meanwhile, the mother liquid discharge tank (9) and the mother liquid tank (18) play a role in buffering, so that the chlorine dioxide preparation system can be continuously and smoothly running.

A method described in the invention, by which the chlorine dioxide gas is produced with high purity, is using the hydrogen peroxide, sulfuric acid and sodium chlorate as raw materials and adopting a horizontal generator, the reaction liquid is heated step by step from 25° C. to 85° C. under a small negative pressure condition, which can effectively avoid salt cake crystallization in the generator due to excessive evaporation of the reaction liquid and blocking the generator, as well as to avoid chlorine dioxide decomposition due to the violent reaction, and the prepared chlorine dioxide gas has a moisture content less than 8% (w/w) and essentially free of chlorine; the blower (7) blows the air into the horizontal generator (4) to dilute the chlorine dioxide gas concentration to 4-9% (V/V) to ensure the chlorine dioxide is stable and not decomposed easily. The by-product salt cake can be concentrated and crystallized by controlling the temperature in the evaporation crystallizer at 70-73° C. and the vacuum degree at −79 to −81 KPa (g) to produce sodium sulfate powder after being filtered and dried. The filtrate liquid returns to the mother liquid lower circulating pipe (23) through pipe (22), no solid and liquid wastes produced.

This invention will be described in detail below with reference to the accompanying drawings and embodiments. The described embodiments are merely some but not all of the embodiments of this invention. All the other embodiments obtained by the technical person in this field based on the embodiments of this invention without creative efforts shall fall within the protection scope of the present invention.

Example 1

As shown in FIG. 1, devices for producing high-purity chlorine dioxide gas include a horizontal generator (4), blower (7), induced draft fan (8), mother liquid discharge tank (9), crystallizer feed pump (10), circulating pump (11), heater (12), evaporation crystallizer (13), filtration unit feed pump (14), filtration unit (15), dryer (16), mother liquid extraction pump (17), mother liquid tank (18), mother liquid return pump (19), air compressor (30). The sulfuric acid pipe (1) is connected with the horizontal generator (4); the hydrogen peroxide pipe (2) joins the sodium chlorate pipe (3) and are connected to the horizontal generator (4); the heat source pipe (5) is connected to the inlet of the horizontal generator (4); the compressed air pipe (6) is connected to the air compressor (30) and the horizontal generator (4); the horizontal generator (4) is connected to the mother liquid discharge tank (9) through a reaction liquid (mother liquid) discharge pipe (25); the mother liquid discharge tank (9) is connected with the mother liquid lower circulating pipe (23) through the inlet/outlet pipe (26) of the crystallizer feed pump; mother liquid lower circulating pipe (23) and upper circulating pipe (24) are connected with the evaporation crystallizer (13), heater (12) and the circulating pump (11); the mother liquid tank (18) is connected to the evaporation crystallizer (13) and the horizontal generator (4) through the inlet/outlet pipe of the mother liquid extraction pump (27) and the inlet/outlet pipe of the mother liquid return pump (20); the heat source pipe (21) is connected to the inlet pipe of the heater (12); the filtration unit (15) is connected to the mother liquid lower circulating pipe (23) through the inlet/outlet pipe of the feed pump (28) and the filtrate pipe (22) to form a circulation loop; the filtration unit (15) is connected to the dryer (16) via the salt cake discharge pipe (29).

Step 1, sulfuric acid enters into the horizontal generator (4) through pipe (1); the reducing agent—hydrogen peroxide is transferred through pipe (2) and enters into the horizontal generator (4) after being mixed with the sodium chlorate in pipe (3), chlorine dioxide gas is generated after the redox reaction. The heat source enters the horizontal generator (4) through pipe (5) to gradually heat the reaction liquid, so that the temperature of the reaction liquid is increased from 20° C. to 80° C. The air is compressed by the air compressor (30) and then enters into the horizontal generator (4) and stirs the reaction liquid to make the reaction uniform while releasing and diluting the chlorine dioxide gas; in addition, the blower (7) blows the air into the horizontal generator (4) for further diluting the chlorine dioxide gas concentration to 4% (V/V); the diluted chlorine dioxide gas is sent out to the end use areas by the induced draft fan (8). The product has a moisture content of 7.8% (w/w) and is essentially free of chlorine.

Step 2, while the raw material enters into the horizontal generator (4) from one end, the reacted reaction liquid is discharged from the other end of the horizontal generator to the mother liquid discharge tank (9) for storage, and then sent to the mother liquid lower circulating pipe (23) by the crystallizer feed pump (10), and circulation, heating, evaporation and concentration between the evaporation crystallizer (13) and the heater (12) under the pumping action of the circulating pump (11); the temperature in the evaporation crystallizer is controlled at 73° C., the vacuum degree is controlled at −79 KPa(g). The salt cake in the mother liquid is concentrated and crystallized and is deposited at the bottom of the evaporation crystallizer (13) and the lower circulating pipe (23) and sent to the filtration device (15) through the feed pump (14) for filtration, washing and concentration. The concentrated solid salt cake is introduced into the dryer (16) to produce sodium sulfate powder with dryness up to 99.6% (which can be sold as a byproduct); the filtrate liquid is returned to the mother liquid circulating pipe (23) via the filtrate pipe (22) for recycling. No solid and liquid wastes produced throughout the production process.

Step 3, the clarified mother liquid in the upper of the evaporation crystallizer (13) is sent to the mother liquid tank (18) by the mother liquid extraction pump (17) for buffering, and then sent to the horizontal generator (4) by the mother liquid return pump (19).

Example 2

As shown in FIG. 1, devices for producing high-purity chlorine dioxide gas includes a horizontal generator (4), blower (7), induced draft fan (8), mother liquid discharge tank (9), crystallizer feed pump (10), circulating pump (11), heater (12), evaporation crystallizer (13), filtration unit feed pump (14), filtration unit (15), dryer (16), mother liquid extraction pump (17), mother liquid tank (18), mother liquid return pump (19), air compressor (30). The sulfuric acid pipe (1) is connected with the horizontal generator (4); the hydrogen peroxide pipe (2) joins the sodium chlorate pipe (3) and are connected to the horizontal generator (4); the heat source pipe (5) is connected to the inlet of the horizontal generator (4); the compressed air pipe (6) is connected to the air compressor (30) and the horizontal generator (4); the horizontal generator (4) is connected to the mother liquid discharge tank (9) through a reaction liquid (mother liquid) discharge pipe (25); the mother liquid discharge tank (9) is connected with the mother liquid lower circulating pipe (23) through the inlet/outlet pipe (26) of the crystallizer feed pump; mother liquid lower circulating pipe (23) and upper circulating pipe (24) are connected with the evaporation crystallizer (13), heater (12) and the circulating pump (11); the mother liquid tank (18) is connected to the evaporation crystallizer (13) and the horizontal generator (4) through the inlet/outlet pipe of the mother liquid extraction pump (27) and the inlet/outlet pipe of the mother liquid return pump (20); the heat source pipe (21) is connected to the inlet pipe of the heater (12); the filtration unit (15) is connected to the mother liquid lower circulating pipe (23) through the inlet/outlet pipe of the feed pump (28) and the filtrate pipe (22) to form a circulation loop; the filtration unit (15) is connected to the dryer (16) via the salt cake discharge pipe (29).

The method for preparing 8t/d chlorine dioxide gas using the above mentioned device is as follows:

Step 1, sulfuric acid enters the horizontal generator (4) through pipe (1); the reducing agent—hydrogen peroxide is transferred through pipe (2) and enters the horizontal generator (4) after being mixed with the sodium chlorate in pipe (3), chlorine dioxide gas is generated after the redox reaction. The heat source enters into the horizontal generator (4) through pipe (5) to gradually heat the reaction liquid, so that the temperature of the reaction liquid is increased from 25° C. to 83° C. The air is compressed by the air compressor (30) and then enters the horizontal generator (4) and stirs the reaction liquid to make the reaction uniform while releasing and diluting the chlorine dioxide gas; in addition, the blower (7) blows the air into the horizontal generator (4) for further diluting the chlorine dioxide gas concentration to 6% (V/V); the diluted chlorine dioxide gas is sent out to the end use areas by the induced draft fan (8). The product has a moisture content of 7.8% (w/w) and is essentially free of chlorine.

Step 2, while the raw material enters into the horizontal generator (4) from one end, the reacted reaction liquid is discharged from the other end of the horizontal generator (4) to the mother liquid discharge tank (9) for storage, and then sent to the mother liquid lower circulating pipe (23) by the crystallizer feed pump (10), and circulation, heating, evaporation and concentration between the evaporation crystallizer (13) and the heater (12) under the pumping action of the circulating pump (11); the temperature in the evaporation crystallizer is controlled at 72° C., the vacuum degree is controlled at −80 KPa(g). The salt cake in the mother liquid is concentrated and crystallized and is deposited at the bottom of the evaporation crystallizer (13) and the lower circulating pipe (23) and sent to the filtration device (15) through the feed pump (14) for filtration, washing and concentration. The concentrated solid salt cake is introduced into the dryer (16) to produce sodium sulfate powder with dryness up to 99.65% (which can be sold as a byproduct); the filtrate liquid is returned to the mother liquid circulating pipe (23) via the filtrate pipe (22) for recycling. No solid and liquid wastes produced throughout the production process.

Step 3, the clarified mother liquid in the upper of the evaporation crystallizer (13) is sent to the mother liquid tank (18) by the mother liquid extraction pump (17) for buffering, and then sent to the horizontal generator (4) by the mother liquid return pump (19).

Example 3

As shown in FIG. 1, a device for producing high-purity chlorine dioxide gas includes a horizontal generator (4), blower (7), induced draft fan (8), mother liquid discharge tank (9), crystallizer feed pump (10), circulating pump (11), heater (12), evaporation crystallizer (13), filtration unit feed pump (14), filtration unit (15), dryer (16), mother liquid extraction pump (17), mother liquid tank (18), mother liquid return pump (19), air compressor (30). The sulfuric acid pipe (1) is connected with the horizontal generator (4); the hydrogen peroxide pipe (2) joins the sodium chlorate pipe (3) and are connected to the horizontal generator (4); the heat source pipe (5) is connected to the inlet of the horizontal generator (4); the compressed air pipe (6) is connected to the air compressor (30) and the horizontal generator (4); the horizontal generator (4) is connected to the mother liquid discharge tank (9) through a reaction liquid (mother liquid) discharge pipe (25); the mother liquid discharge tank (9) is connected with the mother liquid lower circulating pipe (23) through the inlet/outlet pipe (26) of the crystallizer feed pump; mother liquid lower circulating pipe (23) and upper circulating pipe (24) are connected with the evaporation crystallizer (13), heater (12) and the circulating pump (11); the mother liquid tank (18) is connected to the evaporation crystallizer (13) and the horizontal generator (4) through the inlet/outlet pipe of the mother liquid extraction pump (27) and the inlet/outlet pipe of the mother liquid return pump (20); the heat source pipe (21) is connected to the inlet pipe of the heater (12); the filtration unit (15) is connected to the mother liquid lower circulating pipe (23) through the inlet/outlet pipe of the feed pump (28) and the filtrate pipe (22) to form a circulation loop; the filtration unit (15) is connected to the dryer (16) via the salt cake discharge pipe (29).

The method for preparing 12t/d chlorine dioxide gas using the above mentioned device is as follows:

Step 1, sulfuric acid enters into the horizontal generator (4) through pipe (1); the reducing agent—hydrogen peroxide is transferred through pipe (2) and enters into the horizontal generator (4) after being mixed with the sodium chlorate in pipe (3), chlorine dioxide gas is generated after the redox reaction. The heat source enters the horizontal generator (4) through pipe (5) to gradually heat the reaction liquid, so that the temperature of the reaction liquid is increased from 30° C. to 85° C. The air is compressed by the air compressor (30) and then enters the horizontal generator (4) and stirs the reaction liquid to make the reaction uniform while releasing and diluting the chlorine dioxide gas; in addition, the blower (7) blows the air into the horizontal generator (4) for further diluting the chlorine dioxide gas concentration to 9% (V/V); the diluted chlorine dioxide gas is sent out to the end use areas by the induced draft fan (8). The product has a moisture content of 7.5% (w/w) and is essentially free of chlorine.

Step 2, while the raw material enters into the horizontal generator (4) from one end, the reacted reaction liquid is discharged from the other end of the horizontal generator (4) to the mother liquid discharge tank (9) for storage, and then sent to the mother liquid lower circulating pipe (23) by the crystallizer feed pump (10), and circulation, heating, evaporation and concentration between the evaporation crystallizer (13) and the heater (12) under the pumping action of the circulating pump (11); the temperature in the evaporation crystallizer is controlled at 70° C., the vacuum degree is controlled at −81 KPa(g). The salt cake in the mother liquid is concentrated and crystallized and is deposited at the bottom of the evaporation crystallizer (13) and the lower circulating pipe (23) and sent to the filtration device (15) through the feed pump (14) for filtration, washing and concentration. The concentrated solid salt cake is introduced into the dryer (16) to produce sodium sulfate with dryness up to 99.6% (which can be sold as a product); the filtrate is returned to the mother liquid circulating pipe (23) via the filtrate pipe (22) for recycling. No solid and liquid wastes produced throughout the production process.

Step 3, the clarified mother liquid in the upper of the evaporation crystallizer (13) is sent to the mother liquid tank (18) by the mother liquid extraction pump (17) for buffering, and then sent to the horizontal generator (4) by the mother liquid return pump (19).

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A device configured to produce high-purity chlorine dioxide gas, comprising:
   a sulfuric acid pipe connected to a horizontal generator;
   a hydrogen peroxide pipe joined by a sodium chlorate pipe and connected to the horizontal generator;
   a first heat source pipe connected to an inlet of the horizontal generator;
   a compressed air pipe connected to an air compressor and the horizontal generator, wherein
      the horizontal generator connected to a mother liquor discharge tank via a reaction liquid discharge pipe or a mother liquor discharge pipe,
      the mother liquor discharge tank connected with a mother liquor lower circulating pipe by way of an inlet and outlet pipe of a crystallizer feed pump, and
      the mother liquor lower circulating pipe and an upper circulating pipe are connected to an evaporation crystallizer, a heater and a circulating pump;
   a mother liquor tank connected to the evaporation crystallizer and the horizontal generator through an inlet and outlet pipe of a first mother liquor extraction pump and an inlet and outlet pipe of a mother liquor return pump;
   a second heat source pipe connected to an inlet pipe of the heater; and
   a filtration unit connected to the mother liquor lower circulating pipe through an inlet and outlet pipe of a feed pump and a filtrate pipe to form a circulation loop and
   the filtration unit connected to a dryer via a salt cake discharge pipe.

2. The device of claim 1, wherein
   the mother liquor discharge tank and the mother liquor tank are situated between the horizontal generator and the evaporation crystallizer to separate the horizontal generator and the evaporation crystallizer, and
   the mother liquor discharge tank and the mother liquor tank are configured to buffer, so that device operates continuously and smoothly.

3. The device of claim 2, wherein
   the mother liquor discharge tank equipped with the crystallizer feed pump is connected with the horizontal generator and the mother liquor lower circulating pipe by way of the reaction liquid discharge pipe and the inlet and outlet pipe of the crystallizer feed pump to form an inlet channel for the reaction liquid of the horizontal generator entering into the evaporation crystallizer,
   the mother liquor tank equipped with a mother liquid second mother liquor extraction pump and mother liquor return pump is connected to the evaporation crystallizer and the horizontal generator by way of an inlet and outlet pipe of the second mother liquor extraction pump and the inlet and outlet pipe of the mother liquor return pump to form a return channel for a supernatant liquid of the evaporation crystallizer returning to the horizontal generator.

4. The device of claim 3, wherein
   the evaporation crystallizer, the heater and the circulating pump are connected in series via the mother liquor lower circulating pipe and the upper circulating pipe to form a circulation loop for heating, evaporation and crystallization.

5. The device of claim 4, wherein
   the filtration unit configured with the feed pump is connected with the dryer by way of the filtrate pipe, the salt cake discharge pipe and the mother liquor lower circulating pipe to form a filtrate liquid return channel and salt cake treatment channel.

* * * * *